(12) United States Patent
Dotsubo et al.

(10) Patent No.: US 6,721,002 B1
(45) Date of Patent: Apr. 13, 2004

(54) METHOD FOR RECORDING IMAGE DATA AND DIGITAL CAMERA USING SAME ADAPTED TO COMPOSITE A PLURALITY OF IMAGE DATA AND RECORD THE COMPOSITE IMAGE DATA INTO A MEMORY

(75) Inventors: Nobuhide Dotsubo, Daito (JP); Hideto Hayashi, Daito (JP); Toshinobu Haruki, Kyotanabe (JP); Toshiyuki Toyofuku, Hachioji (JP)

(73) Assignees: Sanyo Electric Co., Ltd., Moriguchi (JP); Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/095,573

(22) Filed: Jun. 11, 1998

(30) Foreign Application Priority Data

Jun. 13, 1997 (JP) ............................................. 9-157163

(51) Int. Cl.⁷ ........................... H04N 5/262; H04N 5/76
(52) U.S. Cl. ................. 348/239; 348/231.2; 348/231.5; 348/333.12
(58) Field of Search .............................. 358/906, 909.1; 348/207, 220, 222, 231, 232, 233, 333.01, 333.02, 333.04, 333.11, 333.12, 552, 584, 586, 589, 598, 600, 239, 231.99, 231.1, 231.2, 231.3, 231.5; 345/113, 114, 115, 116, 433, 435; 382/299

(56) References Cited

U.S. PATENT DOCUMENTS

| 5,016,107 A | * | 5/1991 | Sasson | 348/233 |
|---|---|---|---|---|
| 5,027,214 A | | 6/1991 | Fujimori | 348/233 |
| 5,477,264 A | * | 12/1995 | Sarbadhikari | 348/231 |
| 5,581,311 A | * | 12/1996 | Kuroiwa | 348/231.2 |
| 5,633,678 A | * | 5/1997 | Parulski | 348/232 |
| 5,633,976 A | * | 5/1997 | Ogino | 348/231 |
| 5,682,202 A | * | 10/1997 | Watanabe | 348/231 |
| 5,742,339 A | * | 4/1998 | Wakui | 348/233 |
| 5,867,214 A | * | 2/1999 | Anderson | 348/231 |
| 5,986,700 A | | 11/1999 | Wakui | 348/231 |
| 6,094,282 A | * | 7/2000 | Hoda | 358/909.1 |
| 6,111,605 A | * | 8/2000 | Suzuki | 348/231.99 |
| 6,147,703 A | * | 11/2000 | Miller | 348/220 |
| 6,239,837 B1 | * | 5/2001 | Yamada | 348/231 |
| 6,515,697 B1 | * | 2/2003 | Yamada | 348/231.6 |
| 2001/0000969 A1 | | 5/2001 | Ohta | 348/231 |

FOREIGN PATENT DOCUMENTS

| JP | 5-336484 | 12/1993 |
| JP | 6-78260 | 3/1994 |
| JP | 8-140025 | 5/1996 |

* cited by examiner

Primary Examiner—Ngoc-Yen Vu
(74) Attorney, Agent, or Firm—Armstrong, Kratz, Quintos, Hanson & Brooks, LLP

(57) ABSTRACT

A digital camera including a memory card for storing a composite image data. When an operator selects template image data and photographed image data recorded in a memory card, a CPU composites these image data with each other by using a DRAM. The CPU then compares a data amount of composite image data with a vacant capacity of the memory card. If the data amount is less than the vacant capacity, the composite image data is recorded into the memory card. Meanwhile, when the data amount is greater than the vacant capacity, the CPU displays a predetermined alarm message on an LCD. Here, if the operator attaches another memory card, the CPU again compares the data amount of the composite image data with a vacant capacity of a memory card newly attached. If the vacant capacity is sufficient, the composite image data is recorded to the same memory card.

8 Claims, 9 Drawing Sheets

FIG. 10(A)

| TEMPLATE IMAGE ① | TEMPLATE IMAGE ② | IMAGE ③-1 (COMPOSITE IMAGE) | IMAGE ② | IMAGE ③-2 (COMPOSITE IMAGE) | IMAGE ④ | IMAGE ⑤ | IMAGE ⑥ |
|---|---|---|---|---|---|---|---|

FIG. 10(B)

| TEMPLATE IMAGE ① | TEMPLATE IMAGE ② | IMAGE ③-1 (COMPOSITE IMAGE) | IMAGE ② | IMAGE ③-2 (COMPOSITE IMAGE) | IMAGE ⑤ | IMAGE ⑥ |
|---|---|---|---|---|---|---|

FIG. 10(C)

| TEMPLATE IMAGE ③ | TEMPLATE IMAGE ④ | IMAGE ⑦ (COMPOSITE IMAGE) |
|---|---|---|

METHOD FOR RECORDING IMAGE DATA AND DIGITAL CAMERA USING SAME ADAPTED TO COMPOSITE A PLURALITY OF IMAGE DATA AND RECORD THE COMPOSITE IMAGE DATA INTO A MEMORY

BACKGROUND OF THE INVENTION

1. Field of the Invention

This invention relates to a method for recording image data and a digital camera using same, and more particularly to a method for recording image data and a digital camera, adapted to composite a plurality of image data and record the composited image data into a memory.

2. Description of the Related Art

Conventional digital cameras are arranged to record all the image data photographed into a flash memory incorporated therein. In such a digital camera, if a plurality of images are selected using an LCD, the image data elements are composited and the resulting composited image data is stored into the memory.

In the art as stated above, however, where the flash memory is insufficient in capacity, the composited image data is impossible to record therein. In order to record the data, the image data existing within the flash memory has to be erased to create a further vacant capacity, and the above operation has to be made again. In this manner, when the flash memory becomes less in vacant capacity, troublesome operations are required.

SUMMARY OF THE INVENTION

Therefore, it is a primary object of this invention to provide a method for recording image data which is capable of recording composite image data into a memory without requiring troublesome operations.

This invention is a method for recording image data, comprising the steps of: (a) compositing a plurality of image data recorded in an applied memory card with one another; (b) comparing a data amount of a composite image data obtained by the step (a) with a vacant capacity of said memory card; (c) recording the composite image data into said memory card when the data amount is less than the vacant capacity; (d) generating an alarm when the data amount is greater than the vacant capacity; and (e) returning to the step (b) when another memory card is applied.

If the plurality of image data recorded in the memory card are composited, the data amount of the composite image data is compared with the vacant capacity of the memory card. When the data amount of the composite image data is less than the vacant capacity of the memory card, the composite image data is recorded into the memory card. On the other hand, when the data amount of the composite image data is greater than the vacant capacity of the memory card, an alarm is generated. Here, if another memory card is attached, the data amount of the composite image data is again compared with an vacant capacity of the memory card, the above-stated operation is repeated.

In one aspect of this invention, any of the plurality of image data is not erased when these data are composited.

In another aspect of this invention, at least one of the plurality of image data is erased prior to the comparison of the data amount of the composite image data with the vacant capacity of the memory card.

In one embodiment of this invention, the plurality of image data include photographed image data and particular image data, and the photographed image data is erased when the compositing is completed. Incidentally, the particular image data is either one of template image data or title image data.

According to this invention, where the data amount of the composite image data is greater than the vacant capacity of the memory card, an alarm is generated. When another memory card with a sufficient vacant capacity is attached, the composite image data is recorded into the same memory card, thus eliminating troublesome operations.

This invention is a digital camera, comprising: a compositing means for compositing a plurality of image data recorded in an applied memory card with one another; a comparing means for comparing a data amount of composite image data outputted from said compositing means with a vacant capacity of said memory card; a recording means for recording the composite image data into said memory card when the data amount is less than the vacant capacity; and a generating means for generating an alarm when the data amount is greater than the vacant capacity.

If the plurality of image data recorded in the memory card are composited, the data amount of the composite image data is compared with the vacant capacity of the memory card. When the data amount of the composite image data is less than the vacant capacity of the memory card, the composite image data is recorded into the memory card. On the other hand, when the data amount of the composite image data is greater than the vacant capacity of the memory card, an alarm is generated.

In one aspect of this invention, an erasing means erases at least one of the plurality of image data prior to comparison by said comparing means.

In one embodiment of this invention, the plurality of image data include photographed image data and particular image data, and the erasing means including a photographed image erasing means for erasing the photographed image data. Incidentally, the particular image data is either one of template image data or title image data.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIGS. 10(A), 10(B) and 10(C) are illustrative views showing another part of the operation in the FIG. 8 embodiment.

DETAILED DESCRIPTION OF THE PREFERRED EMBODIMENTS

Figure 1:
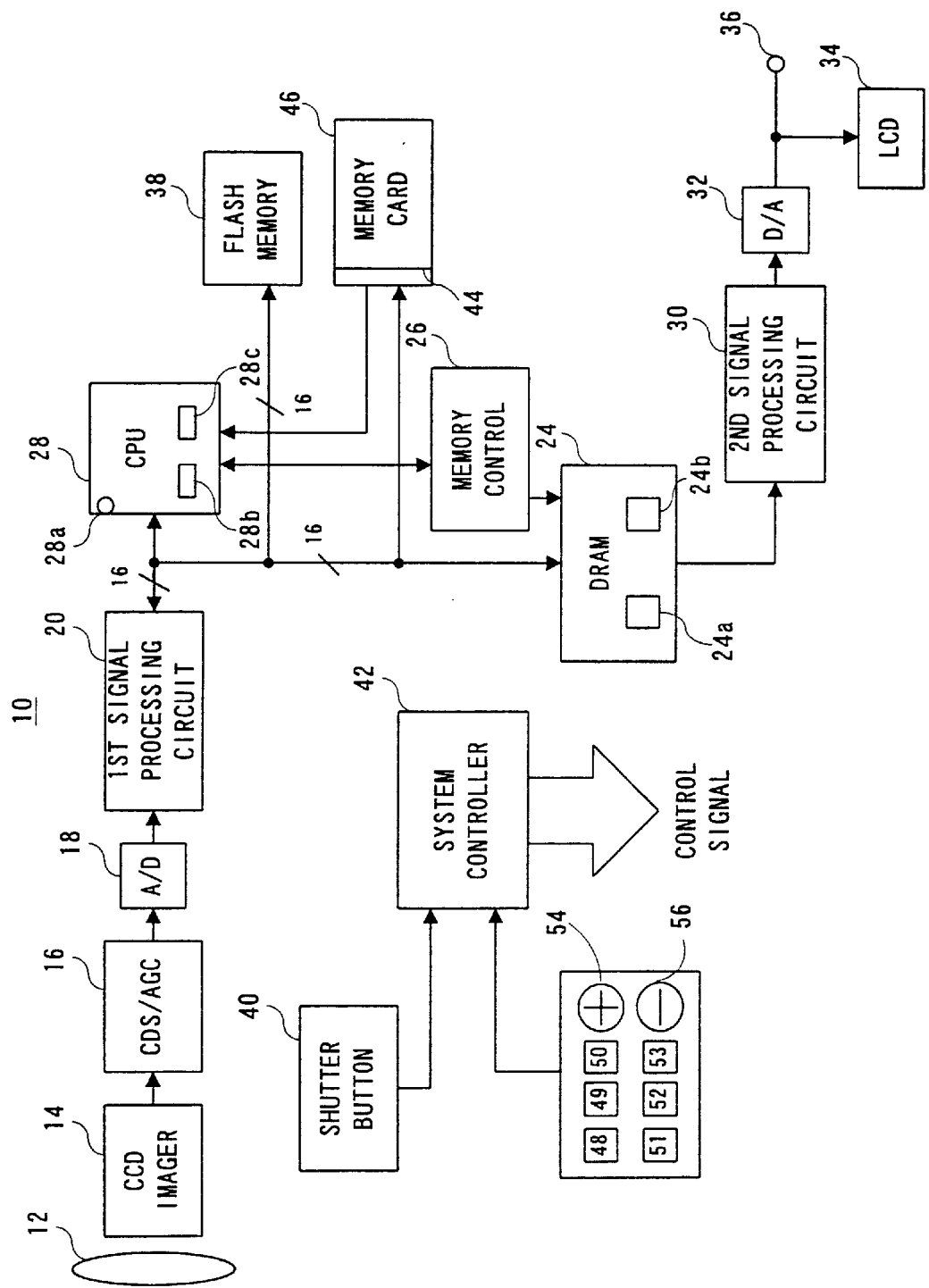
FIG. 1 is a block diagram showing one embodiment of this invention.

Referring to FIG. 1, a digital camera 10 of this embodiment includes a lens 12. An optical image incident upon this lens 12 is given to a CCD imager 14 through a color filter having $C_y$, $Y_e$, $M_g$ and G arranged in a mosaic form.

When outputting a motion picture through a monitor 34, the CCD imager 14 performs so-called well-known pixel mixing readout to supply a resulting pixel signal to a CDS/AGC circuit 16. The CDS/AGC circuit 16 performs well-known noise removal and level adjustment on the inputted pixel signal. The pixel signal processed by this CDS/AGC circuit 16 is then converted by an A/D converter 18 into digital data, i.e., pixel data. A first signal processing circuit 20 receives the pixel data outputted from the A/D converter 18 to calculate luminance data (Y data) and color-difference data (U data and V data). Upon creating Y data, the inputted pixel data is averaged according to Equation 1.

For a line (H1 + H2)  [Equation 1]
$$Y = \{(Mg + Ye) + (G + Cy)\}/2$$
$$= \{(R + B + R + G) + (G + B + G)\}/2$$
$$= (2R + 3G + 2B)/2$$

For a line (H3 + H4)
$$Y = \{(G + Ye) + (Mg + Cy)\}/2$$
$$= \{(G + G + R) + (R + B + B + G)\}/2$$
$$= (2R + 3G + 2B)/2$$

where, $Mg = R + B$, $Ye = R + G$, and $Cy = B + G$

Since the Y data is proportional to 2R+3G+2B, the component B is reproduced brighter than the y data (=0.3R+0.59G+0.11B) specified by the NTSC standard. This, however, raises no practical problem.

Meanwhile, when creating U data and V data, the first signal processing circuit 20 performs subtraction between adjacent pixels according to Equation 2.

For the line (H1 + H2)  [Equation 2]
$$U = \{(Mg + Ye) - (G + Cy)\}$$
$$= \{(R + B + R + G) - (G + B + G)\}$$
$$= 2R - G$$

For the line (H3 + H4)
$$V = \{(G + Ye) - (Mg + Cy)\}$$
$$= \{(G + G + R) + (R + B + B + G)\}$$
$$= G - 2B$$

where, $Mg = R + B$, $Ye = R + G$, and $Cy = B + G$

However, the color-difference data is available only every other line. Accordingly, the first signal processing circuit 20 supplements for deficient color-difference data on a current line by using the color difference data on the preceding line. That is, V data only is available on a line (H3+H4) so that the U data on a line (H1+H2) is utilized for the U data for the line (H3+H4).

The Y, U and V data thus created are written by a memory control circuit 26 into a memory area 24a of a DRAM 24 through an internal bus 22, and are thereafter outputted to a second signal processing circuit 30. The second signal processing circuit 30, when outputting a motion picture, performs predetermined horizontal and vertical interpolations on the Y, U and V data (motion picture data) from the DRAM 24 so that these data become suited for a display-screen size of an LCD 34. The motion picture data, supplied from the second signal processing circuit 30, is converted by a D/A converter 32 into an analog signal. This analog signal is supplied to the LCD 34, and also outputted through an output terminal 36. As a result, a motion picture is outputted through the LCD 34.

When an operator depresses the shutter button 40, a system controller 42 controls the CCD imager 14 so as to perform so-called all-pixel readout. Due to this, the CCD imager 14 outputs pixel signals at every other line. Since the CCD imager 14 is mounted with a color filter in a mosaic form, $C_y$ and $Y_e$ are alternately outputted at an odd line, while $M_g$ and G are alternately outputted at an even line. The CDS/AGC circuit 16 performs noise removal and level adjustment on the pixel signal, similarly to the above. The A/D converter 18 converts the pixel signal from the CDS/AGC circuit 16 into digital data, i.e. pixel data. The CCD imager 14 is disabled after outputting 1 frame of pixel signals. The 1-frame pixel data outputted from the A/D converter 18 is directly delivered onto a bus 22 without processed by the first signal processing circuit 20. The pixel data is written into the memory area 24a by the memory control circuit 26.

The CPU 28 converts the pixel data of the memory area 24a into Y (=$Y_2$), U and V data, according to Equation 3 to Equation 5, with using a working area 24c. The converted Y, U and V data, i.e. photographed image data, are compressed according to a JPEG format, and written into a memory card 46.

$$Y_b = C_y + Y_c + M_g + G$$  [Equation 3]
$$C_b = (C_y + M_g) - (Y_c + G)$$
$$C_r = (Y_c + M_g) - (C_y + G)$$

$$R = k_{11} \times Y_h + k_{12} \times C_b + k_{13} \times C_r$$  [Equation 4]
$$G = k_{21} \times Y_h + k_{22} \times C_b + k_{23} \times C_r$$
$$B = k_{31} \times Y_h + k_{32} \times C_b + k_{33} \times C_r$$

$$Y_L = 0.299 \times R + 0.587 \times G + 0.114 \times B$$  [Equation 5]
$$U = B - Y_L$$
$$V = R - Y_L$$

Due to the color separation and YUV conversion as stated above, adjacent 4(2×2) pixels of $C_y$, $M_g$, $Y_e$ and G data are used to create 1-pixel Y, U and V data of the 4 pixels, thereby providing Y, U and V data for all the pixels.

The memory control circuit 26 reads $Y_e$, $C_y$, $M_g$ and G pixel data on a line-by-line basis out of the memory area 24a, and supplies them to the second signal processing circuit 30. The second signal processing circuit 30, when outputting a photographed image, performs color separation and YUV-conversion on the pixel data according to Equation 3 to Equation 5, thereby outputting a photographed image (freeze image) on the LCD 34.

If the operator depresses a reproduced button 49, the CPU 28 reads desired compressed data out of a memory card 46, and expands the compressed data with using a working area 24b. The expanded image data (YUV data) is stored in the memory area 24a, and read out later. The second signal processing circuit 30, in a reproducing mode, performs horizontal and vertical interpolations on the image data. This allows a reproduced image to be displayed on the LCD 34.

Figure 2A:
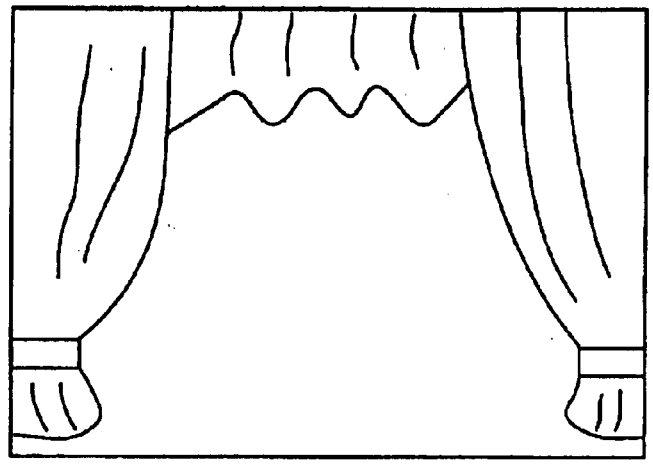
FIG. 2(A) is an illustrative view showing a template image, FIG. 2(B) an illustrative view showing a normal image, and FIG. 2(C) an illustrative view showing a composite image.

The memory card 46 may use, for example, a template card that has a template image previously prepared as shown in FIG. 2(A) and a template code written therewith. With such a card, the operator can set either one of a normal reproducing mode or a card-function reproducing mode by operating a reproducing mode setting button 48.

Figure 2B:
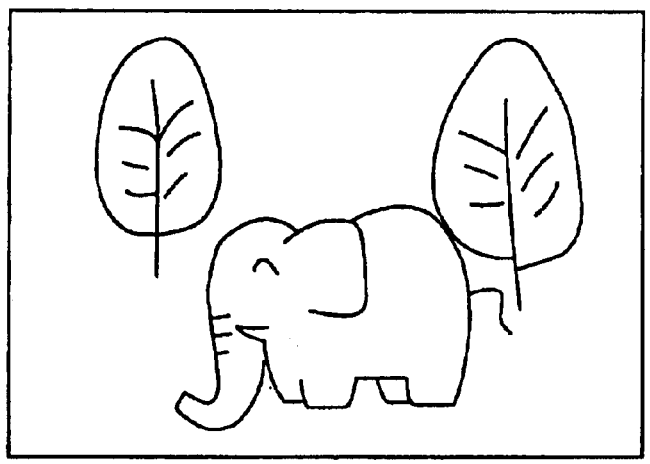
Figure 2C:
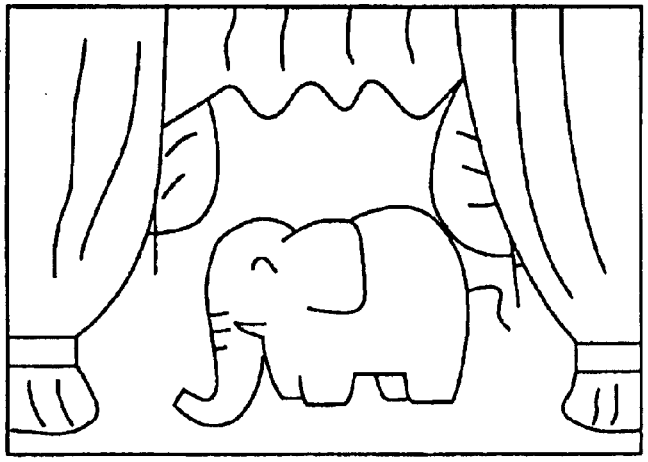

In the normal reproducing mode, if the operator manipulates a +button 54 or –button 56, any one of image data that has been recorded in the memory card 46 is read out. Thus, a reproduced image is displayed on the LCD 34, similarly to the above. That is, if a template image shown in FIG. 2(A) and a photographed image shown in FIG. 2(B) are recorded in the memory card 46, then either one of the images will be outputted through the LCD 34.

Where the card-function reproducing mode is set, if the operator operates the +button 54, the –button 56 and the selecting button 50, an image composited by the template image and the photographed image can be created as shown in FIG. 2(C).

Figure 3A:
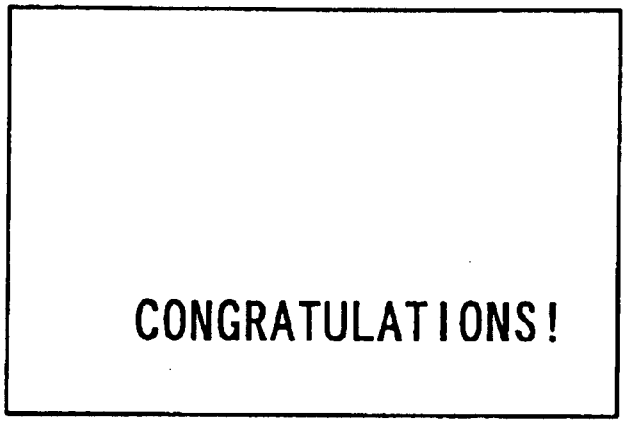
FIG. 3(A) is an illustrative view showing a title image, FIG. 3(B) an illustrative view showing a normal image, and FIG. 3(C) an illustrative view showing a composite image.
Figure 3B:
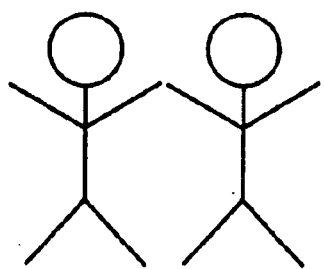
Figure 3C:
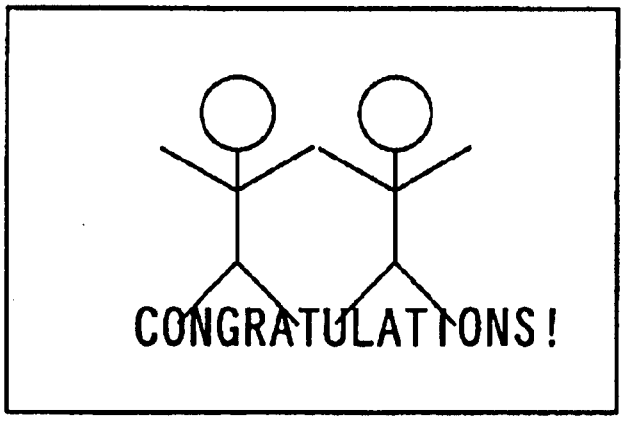

Meanwhile, if the memory card 46 uses a binary-coded card written with a binary code, title image data as shown in FIG. 3(A) can be composited with photographed image data as shown in FIG. 3(B) to create a composite image as shown in FIG. 3(C). The title image data in FIG. 3(A) can be obtained if the operator operates a photographing mode setting button 51 to set a title image mode, and close-up photographs a character-depicted subject as shown in FIG. 3(A).

Incidentally, the template image data and the title image data are accommodated in an image file having a file name "syn0000S.jpg" (S is an integer), while the photographed image data and the composite image data are in an image file with a file name "pic0000P.jpg" (P is an integer).

Figure 4:
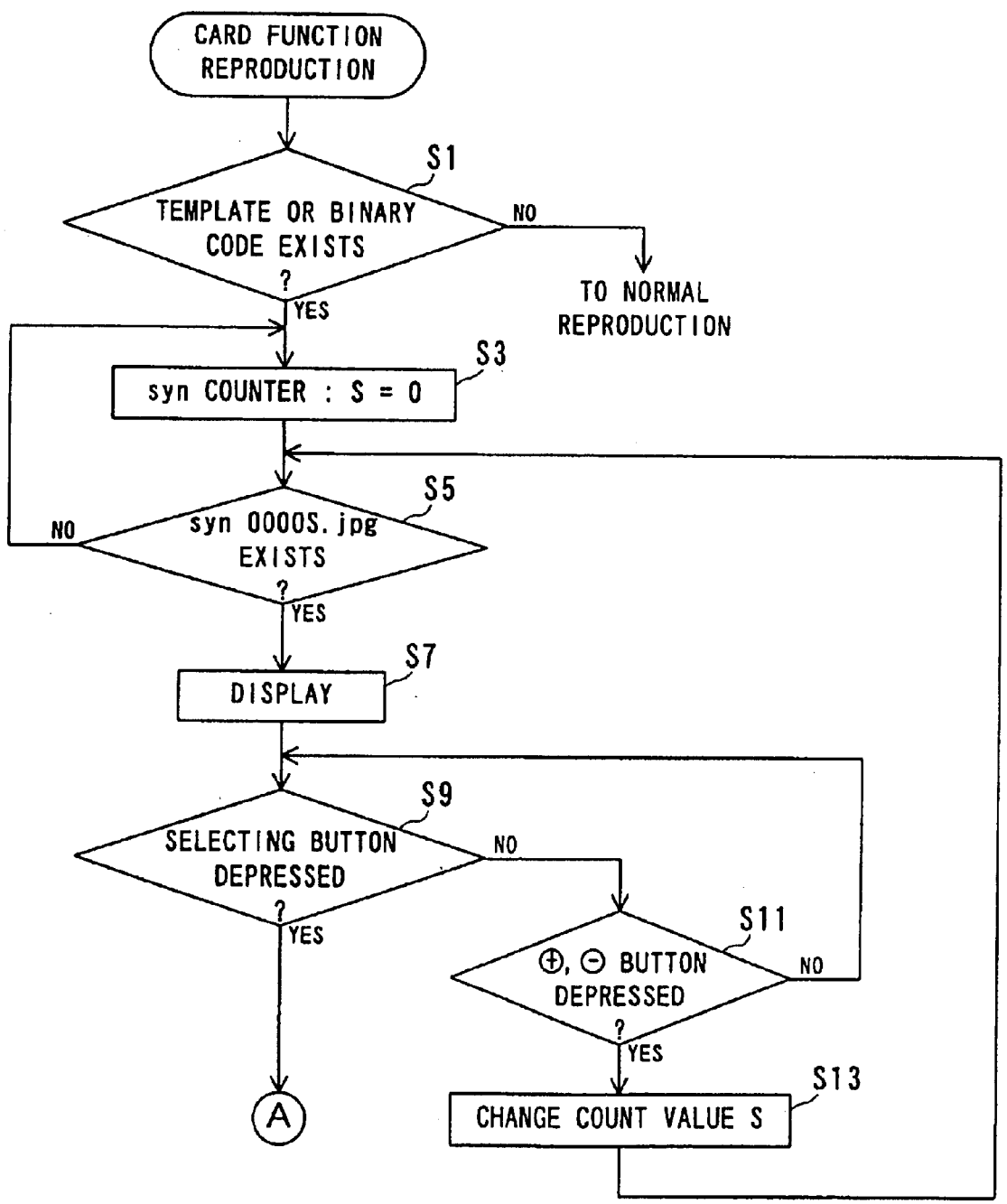
FIG. 4 is a flowchart showing part of operation in the FIG. 1 embodiment.

The CPU 28 performs the above-stated operation according to a program stored in a flash memory 38. When a card-function reproducing mode is set, the operation depends upon the flowcharts shown in FIG. 4 and FIG. 5. That is, the CPU 28 first determines, at a step S1, whether a template code or binary code exists in the memory card 46 or not. If "NO", the process returns to the normal reproducing mode. That is, when a desired memory card is not mounted, even if the operator operates the reproducing mode setting button 48, the card-function reproducing mode cannot be established. If the determination is "YES" at the step S1, the CPU 28 resets, at a step S3, a count value S of the syn counter 28a, and determines at a step S5 whether an image file "syn0000S.jpg" exists or not. If "NO", the process returns to the step S3, while if "YES", the process proceeds to a step S7 to store the data of the image file to the memory area 24a of the DRAM 24, displaying a desired image on the LCD 34.

Subsequently, the CPU 28 determines at a step S9 whether a selecting button 53 is depressed or not. If "NO", it is determined at a step S11 whether the +button 54 or –button 56 is depressed or not. If neither of the +button 54 nor the –button 56 is depressed, the process returns to the step S9, whereby a same image continues to be displayed on the LCD 34. On the other hand, if +button 54 or –button 56 is depressed, the CPU 28 changes the count value S of the syn counter 28a according to the button operation at a step S13, and the process returns to the step S5. This changes over an image to be displayed on the LCD 34. If the selecting button 53 is depressed by the operator, the CPU 28 proceeds to the process from the step S9 to a step S15. In this manner, desired template image data or title image data is first held in the memory area 24a of the DRAM 24.

The CPU 28 resets at the step S15 a count value P of a pic counter 28b, and then determines at a step S17 whether the image file "pic0000P.jpg" exists in the memory card 46 or not. If the determination here is "NO", the process returns to the step S15, while if "YES", the process proceeds to the step S19 to store the image data of the image file to the working area 24b of the DRAM 24, displaying a desired image on the LCD 34. The CPU 28 thereafter determines at a step S21 whether or not the selecting button 53 is depressed. If "NO", it is determined at a step S23 whether the +button 54 or –button 56 is depressed or not. If "NO", the process returns to the step S21, while if "YES", the process advances to a step S25 to change the count value P. Then, the process returns to the step S17.

That is, after the template image data or tile image data is selected, the CPU 28 outputs desired photographed image data through the LCD 34 and waits for a selection by the operator. When the operator finds a desired photographed image and depresses the selecting button 53, the CPU 28 at the step S21 determines "YES", and composites selected two images with each other at a step S27.

Explaining in greater detail, when compositing template image data with photographed image data, the template image data of the memory area 24a is written over the photographed image data stored in the working area 24b. In the case of a template image as shown in FIG. 2(A), since no data exists at an area other than the curtain, the photographed image data is not completely erased by overwriting. As a result, the composite image is as shown in FIG. 2(C).

On the other hand, where compositing the title image data with the photographed image data, since the title image data is binary data having either one of "0" or "1", predetermined color data is written over an address in the working area 24b corresponding to an address having "1". Consequently, when a title image as shown in FIG. 3(A) is composited with a photographed image as shown in FIG. 3(B), a composite image as shown in FIG. 3(C) is obtained.

The CPU 28 then determines at a step S29 whether the memory card 46 is sufficient in vacant capacity or not. That is, the CPU 28 compares a data amount of the composite image, that has been obtained by the step S27 and stored in the working area 24b, with a vacant capacity of the memory card 46. If "YES", the composite image data is recorded into the memory card 46 at a step S31, ending the process. However, if "NO", the CPU 28 displays at a step S33 an alarming message "CHANGE CARD" on the LCD 34. If the operator changes the memory card 46 in response thereto and depresses any button, the CPU 28 determines "YES" at a step S35. It is determined at a step S37 whether there exists a binary code or template code in a newly-attached memory card or not. If "NO", a caution message "CARD IS INCORRECT" is displayed on the LCD 34 at a step S39, and the process returns to the step S35. On the other hand, if it is determined at the step S37 a binary code or template code exists, the CPU 28 returns the process to the step S29, repeating the above process.

Accordingly, if the newly-attached memory card has a binary code or template code and sufficient vacant capacity, the composite image data is recorded into the memory card.

Figure 6A:
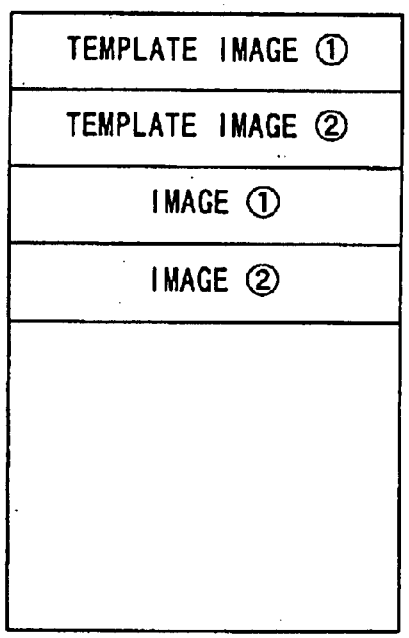
FIGS. 6(A) and 6(B) are illustrative views showing part of operation in FIG. 1 embodiment.
Figure 6B:
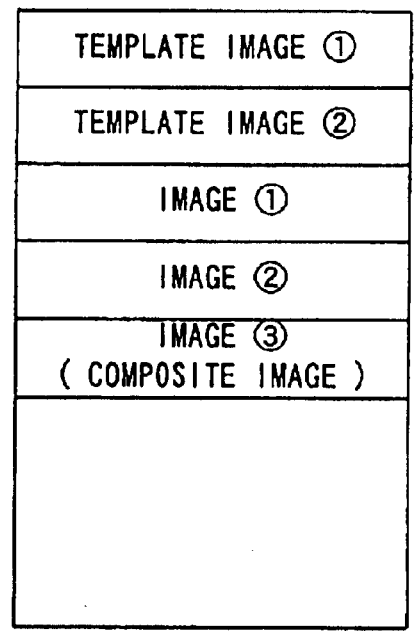

Referring to FIGS. 6(A) and 6(B), the memory card 46 is formed by a template card. The card is recorded with template image data ①, ② and photographed image data ①, ②, and has a sufficient vacant capacity as shown in FIG. 6(A). If the operator combines desired template image data with normal image data, composite image data is recorded following the photographed image data ②, as shown in FIG. 6(B). Incidently, the composite image data has an image file name "pic" that is the same as that of the photographed image data. In this example, the Compositae image data has an image file name "pic00003.jpg".

Figure 7A:
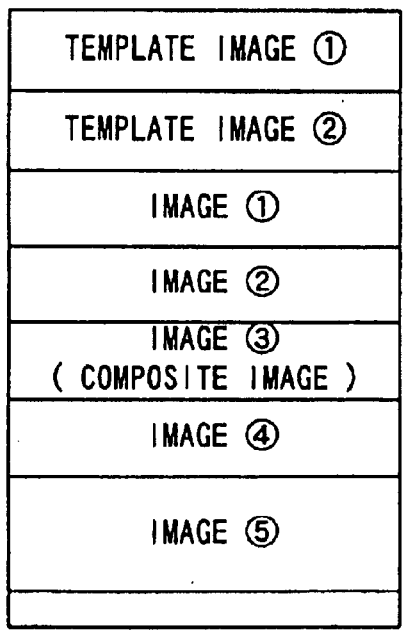
FIGS. 7(A) and 7(B) are illustrative views showing another part of the operation in the FIG. 1 embodiment.
Figure 7B:
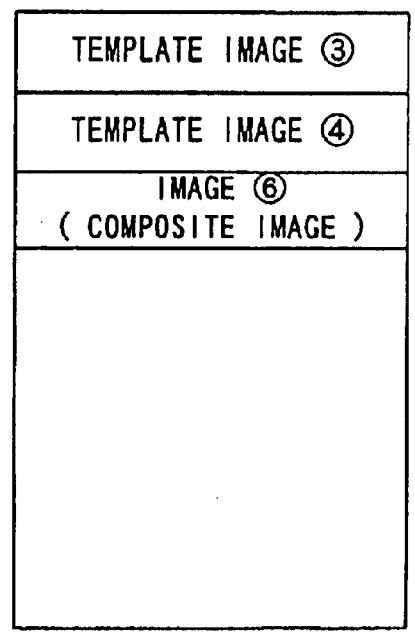

On the other hand, where the memory card 46 has almost no vacant capacity as shown in FIG. 7(A), if the operator tries to composite desired template image data with normal image data, a warning message is displayed on the LCD 34. If the operator replaces the memory card with a new memory card having only template image data ③, ④, composite image data is recorded on the newly attached memory card. That is, the composite image data ⑥ is recorded following the template image data ④, as shown in FIG. 7(B).

According to this embodiment, composite image data is held in the DRAM 24 prior to determining a vacant capacity of the memory card 46 so that, when a memory card with a sufficient vacant capacity is mounted, the composite image data is recorded into the memory card. Accordingly, there is no necessity of re-creating composite image data, thus eliminating troublesome operations.

Figure 5:
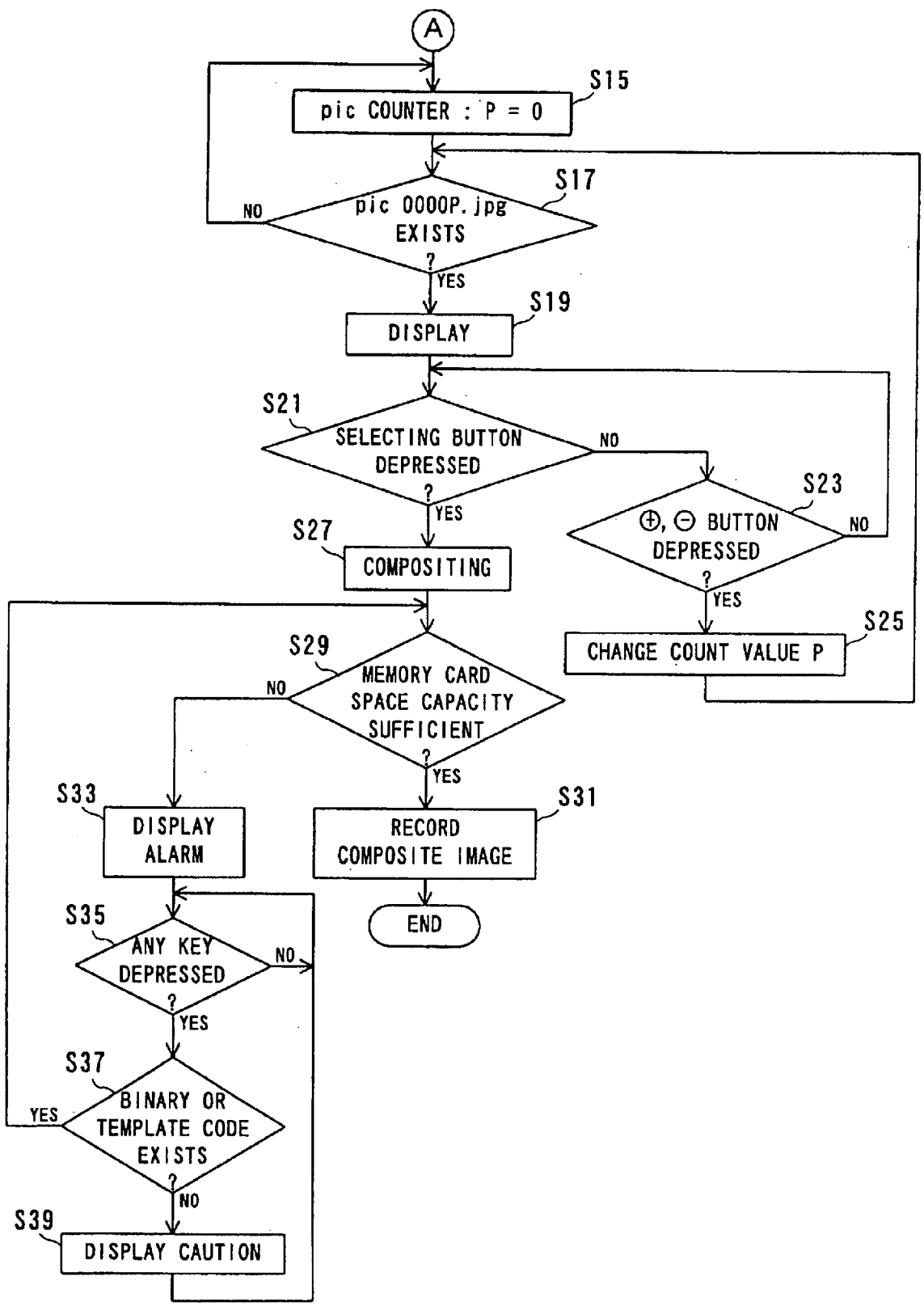
FIG. 5 is a flowchart showing another part of the operation in the FIG. 1 embodiment.

In FIG. 5, if a step S28 is provided that is prior to the step S29 in order to erase the photographed image data having been used in compositing, the vacant capacity is increased by an amount corresponding to the erasure. This can reduce the necessity of exchanging the memory card to create composite image data.

Figure 8:
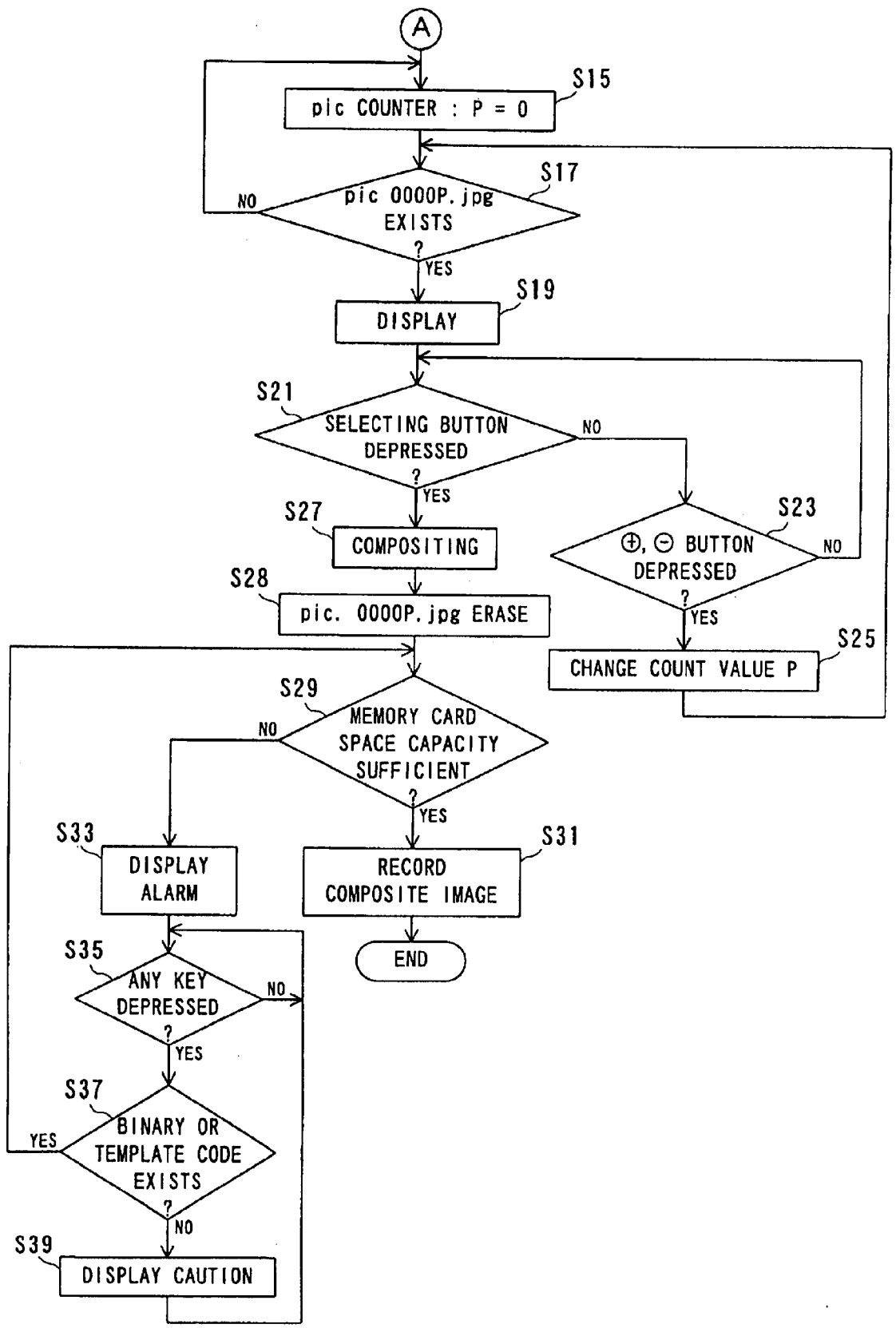
FIG. 8 is a flowchart showing part of operation in anther embodiment of this invention.
Figure 9A:
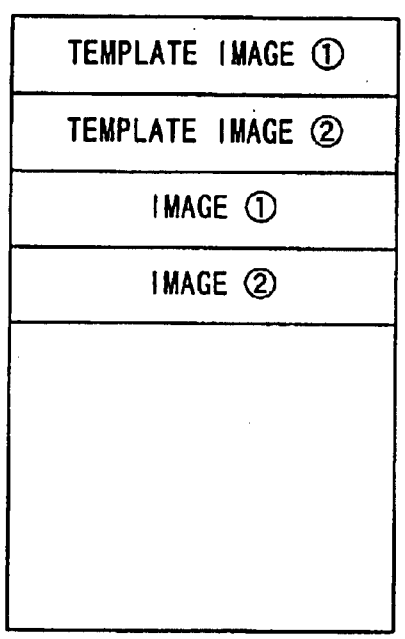
FIGS. 9(A) and 9(B) are illustrative views showing part of operation in the FIG. 8 embodiment.
Figure 9B:
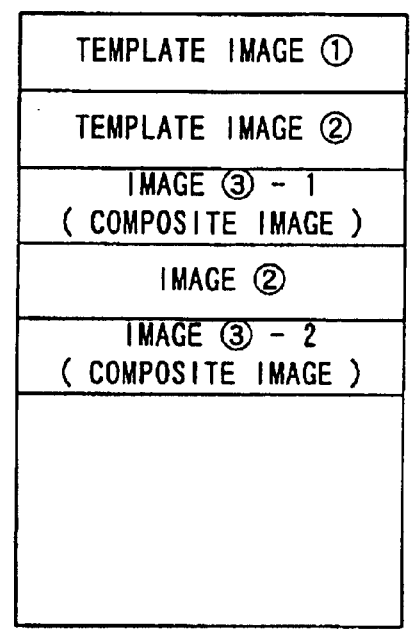

Explanations will now be made on the operation including a step S28 shown in FIG. 8, with reference to FIGS. 9(A) and 9(B) and FIGS. 10(A), 10(B) and 10(C). When the memory card is recorded with template image data ①, ② and photographed image data ①, ② as shown in FIG. 9(A), if the operator combines any of the template image data with the photographed image data ①, the photographed image data ① is erased. Thereafter, composite image data ③ is recorded, as shown in FIG. 9(B), that is, the area on which the photographed image data ① is recorded is utilized for recording composite image data ③, and further the data not having been accommodated in this area is recorded following the photographed image data ②.

On the other hand, when recorded are template image data ①, ②, photographed image data ② ④ ⑤ ⑥ and composite image data ③ as shown in FIG. 10(A), if any of the template image data is composited with the normal image data ④ is erased, as shown in FIG. 10(B). However, if the total vacant capacity after erasure is not greater than a data amount of the composite image data ⑦, the composite image data ⑦ is recorded into a newly-attached memory card. That is, the composite image data ⑦ is recorded into a memory card having been recorded only with template image data ③ ④, for example, as shown in FIG. 10(C).

Incidentally, the various kinds of cards involving SSFDC (Solid-State Floppy Disc Card) may be applied as a memory card. Also, although this embodiment employed the complementary-colored filter having $Y_e$, $C_y$, $M_g$ and G arranged in a mosaic form, it is possible to use a primary-colored filter having R, G and B arranged in a mosaic form.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for recording an image signal into an external memory, comprising the steps of:
   (a) compositing on an internal memory a plurality of image signals recorded in said external memory with one another when accepting an image compositing instruction;
   (b) determining whether or not a vacant capacity of said external memory is sufficient after processing of said step (a);
   (c) recording into said external memory a composite image signal which is created by said step (a) and stored in said internal memory when a determination result of said step (b) is affirmative;
   (d) generating an alarm when a determination result of said step (b) is negative; and
   (e) returning to said step (b) when another external memory has become effective in place of said external memory for the alarm generated by said step (d).

2. A method for recording an image signal according to claim 1, further comprising a step of (f) erasing at least one of the plurality of image signals prior to said step (b).

3. A method for recording image signal according to claim 2, wherein the plurality of image signals include a photographed image signal and a particular image signal, and said step (f) including a step of (f–1) erasing the photographed image signal.

4. A method for recording an image signal according to claim 1, wherein said step (b) includes a step of (b–1) comparing a signal amount of the composite image signal with the vacant capacity of said external memory.

5. A digital camera which records an image signal of a photographed object into an external memory, comprising:
   a compositor for compositing on an internal memory a plurality of image signals recorded in said external memory with one another when accepting an image compositing instruction;
   a determiner for determining whether or not a vacant capacity of said external memory is sufficient after compositing by said compositor;
   a recorder for recording into said external memory a composite image signal which is created by said compositor and stored in said internal memory when a determination result of said determiner is affirmative; and
   a generator for generating an alarm when the determination result of said determiner is negative, wherein when another external memory has become effective in place of said external memory for the alarm generated by said generator, said determiner determines the vacant capacity of said another external memory.

6. A digital camera according to claim 5, further comprising an eraser for erasing at least one of the plurality of image signals prior to determining by said determiner.

7. A digital camera according to claim 6, wherein the plurality of image signals include a photographed image signal and a particular image signal, and said eraser includes a photographed image eraser for erasing the photographed image signal.

8. A digital camera according to claim 5, wherein said determiner includes a comparer for comparing a signal amount of the composite image signal with the vacant capacity of said external memory.

\* \* \* \* \*